(12) United States Patent
Charton et al.

(10) Patent No.: US 7,733,550 B2
(45) Date of Patent: Jun. 8, 2010

(54) DEFORMABLE MIRROR

(75) Inventors: Julien Charton, Brignoud (FR); Zoltan Hubert, Elancourt (FR); Laurent Jocou, Renage (FR); Eric Stadler, La Tronche (FR); Jean-Luc Beuzit, Saint-Jean-le-Vieux (FR); Pierre Kern, Corenc (FR)

(73) Assignees: Centre National de la Recherche Scientifique - CNRS (FR); Universite Joseph Fourier (FR)

( * ) Notice: Subject to any disclaimer, the term of this patent is extended or adjusted under 35 U.S.C. 154(b) by 57 days.

(21) Appl. No.: 11/664,763

(22) PCT Filed: Oct. 12, 2005

(86) PCT No.: PCT/FR2005/002528

§ 371 (c)(1),
(2), (4) Date: Sep. 2, 2008

(87) PCT Pub. No.: WO2006/040477

PCT Pub. Date: Apr. 20, 2006

(65) Prior Publication Data

US 2009/0059340 A1 Mar. 5, 2009

(30) Foreign Application Priority Data

Oct. 12, 2004 (FR) .................................. 04 52342

(51) Int. Cl.
*G02B 26/08* (2006.01)

(52) U.S. Cl. .................................................. 359/224.1
(58) Field of Classification Search ... 359/223.1–226.1, 359/290, 291, 871, 872
See application file for complete search history.

(56) References Cited

U.S. PATENT DOCUMENTS 5,037,184 A 8/1991 Ealey
2004/0017623 A1* 1/2004 Watson ....................... 359/849

FOREIGN PATENT DOCUMENTS

JP 8-334708 A 12/1996

OTHER PUBLICATIONS

O. Cugat et al., "Deformable magnetic mirror for adaptive optics: technological aspects," Sensors and Actuators A/Physical, Elsevier Science B.V., vol. 89, Mar. 20, 2001, pp. 1-9.
Roger Hamelinck et al., "Large adaptive deformable membrane mirror with high actuator density," Advancements in Adaptive Optics, Proceedings of SPIE, vol. 5490, Oct. 2004, pp. 1482-1492.

* cited by examiner

*Primary Examiner*—Euncha P Cherry
(74) *Attorney, Agent, or Firm*—DLA Piper LLP (US)

(57) ABSTRACT

An optoelectric device including a deformable membrane with an outer reflecting surface and an inner surface whereon a plurality of permanent magnets are fixed, and having a bottom surface entirely coated with a continuous layer of a flexible material; and a support including a plurality of electromagnets placed opposite the permanent magnets to exert an electromagnetic force thereon, locally displacing a zone corresponding to the deformable membrane.

16 Claims, 1 Drawing Sheet

DEFORMABLE MIRROR

RELATED APPLICATION

This is a §371 of International Application No. PCT/FR2005/002528, with an international filing date of Oct. 12, 2005 (WO 2006/040477 A1, published Apr. 20, 2006), which is based on French Patent Application No. 04/52342, filed Oct. 12, 2004.

1. Technical Field

This disclosure relates to an optoelectric device comprising a reflecting membrane. More specifically, it relates to a highly dynamic miniature deformable mirror, magnetically actuated, with no local control loop.

2. Background

The main principle of such deformable mirrors is known. For example, JP 08-334708 describes a solution comprising a deformable membrane whereon permanent magnets are fixed. That membrane is held in a frame having a rib in which the membrane is inserted. This frame supports a plate whereon electromagnets which interact with the magnets fixed to the membrane are placed.

The problem posed is that the membrane deforms in a manner which is difficult to model or predict. It has areas wherein the mechanical characteristics of rigidity, mass and natural frequency are very heterogeneous. In practical terms it is therefore essential to associate an electronic servo-circuit of the electromagnets, as well as position sensors for collecting information on actual deformation compared with expected deformation, with an electronic circuit controlling the electric signal applied to each electromagnet in real time, according to a set point and signals supplied by the position sensors.

Servosystems are especially required for large magnetic mirrors. This is due to their high mass, which creates very low resonance frequencies, requiring the creation of a local servosystem working beyond the first resonance. For smaller mirrors, in the absence of a continuous, flexible layer between the magnets and the membrane, it is impossible to maintain suitable optical quality for the mirror. In order to solve this drawback, one solution involves using a very thick membrane, but this would quickly limit the effective stroke. The absence of a local servosystem is a consequence: if the membrane can be kept very thin, very small actuators (and light magnets) can be used. The resonant frequencies are then pushed beyond the bandwidth required by most applications, which prevents the need for a local servosystem.

SUMMARY

We provide an optoelectric device including a deformable membrane with an outer reflecting surface and an inner surface whereon a plurality of permanent magnets are fixed, and having a bottom surface entirely coated with a continuous layer of a flexible material, and a support including a plurality of electromagnets placed opposite the permanent magnets to exert an electromagnetic force thereon, locally displacing a zone corresponding to the deformable membrane.

We also provide a method of manufacturing an optoelectric device including a deformable membrane with an outer reflecting surface and an inner surface whereon a plurality of permanent magnets are fixed, including depositing an adhesive film over the entire bottom surface of the membrane, and depositing the permanent magnets on a part of the adhesive surface.

BRIEF DESCRIPTION OF THE DRAWING

The disclosure will be understood better from reading the following description, made in reference to the appended drawing, wherein.

DETAILED DESCRIPTION

Figure 1:
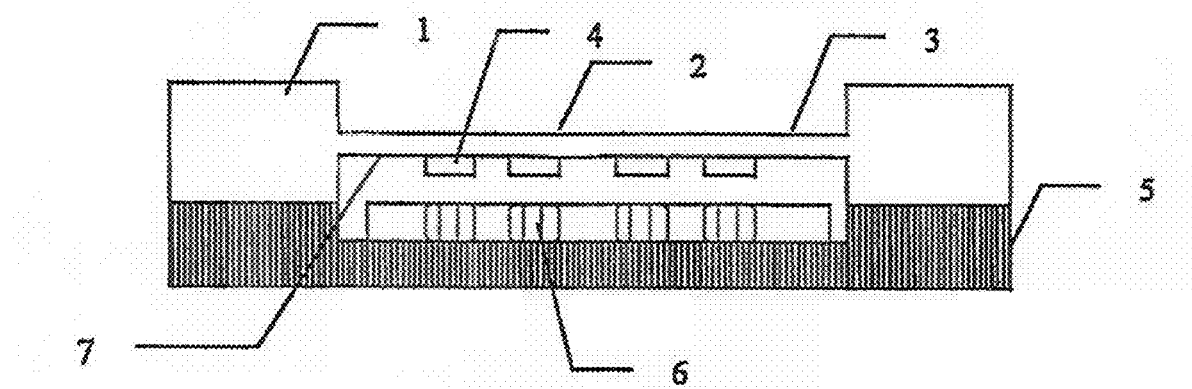
FIG. 1 shows a cross-section view of an actuator according to the invention.

We provide an optoelectric device including, in its broadest sense, a deformable membrane with an outer reflecting surface and an inner surface whereon a plurality of permanent magnets are fixed, the device further comprising a housing including a plurality of electromagnets placed opposite the permanent magnets to exert an electromagnetic force thereon, locally displacing the zone corresponding to the deformable membrane, wherein the bottom surface is coated with a continuous layer of a flexible material. This continuous flexible layer absorbs and distributes the stress generated by a more standard magnet assembly (by gluing points or any other medium).

This continuous flexible layer is preferably adhesive. It thus enables adhesion.

This membrane advantageously includes a thinner area of the frame providing the mechanical bond with the electromagnet support.

The following can be added: According to a specific aspect, this frame is fixed to the support by three spacers adhered using a flexible silicon adhesive. These spacers can advantageously be made using malleable balls of a tin-lead alloy (currently used for electronic connector technology), which are crushed on the appropriate side by a Palmer or any other calibrated device.

The membrane may be made of silicon with a thickness comprised between 5 and 50 micrometers.

The electromagnets can include a core with a cylindrical area whereon a spool is placed, at least one part of the core being housed in a plate with housings organized in a configuration identical to that of the magnets fixed to the membrane.

The magnets and electromagnets may form an N×N array, the corners of which are unoccupied.

The membrane preferably has an active central disc-shaped area equipped with magnets and a peripheral annular area free of magnets.

The diameter of the active area may be between 0.3 and 0.7 times the outer diameter of the membrane.

We also provide a method of manufacturing an optoelectric device including a deformable membrane with an outer reflecting surface and an inner surface whereon a plurality of permanent magnets are fixed, characterized in that it comprises a step of depositing an adhesive film over the entire bottom surface of the membrane, and of depositing the permanent magnets on a part of the adhesive surface.

The step of depositing the adhesive is advantageously carried out by centrifugation of the adhesive deposited locally on the surface of the membrane.

The permanent magnets may be disposed on a temporary support, the adhesive surface then being moved over the surface of the magnets thus predisposed.

The membrane may be formed by thinning a disc-shaped area of a homogenous block.

The membrane formation step may be carried out by plasma etching.

The membrane formation step may be carried out by photolithography.

The membrane formation step may be carried out by chemical etching.

Turning now to the Drawing, FIG. 1 shows a non-limiting example of an aspect of a deformable mirror.

It comprises a monolithic silicon part, having an annular area (1) forming a frame, extended by a thinner central area, which constitutes the reflecting membrane.

This reflecting membrane has a central active area (2) surrounded by a suspension crown (3). The active area (2) includes permanent magnets (4) on the rear/bottom surface (7). The magnets are made from an iron-nickel-chromium alloy, with a thickness of 250 micrometers, magnetized perpendicular to the membrane surface. They have a diameter of 850 micrometers. These magnets (4), 52 in number, are disposed in the shape of an array network with 8×8 slots, the four corners being free of magnets.

The magnets can all be magnetized in the same direction, with a south pole on the same side or, conversely, magnetized alternately.

As an example, the reflecting membrane has a diameter of 30 millimeters, and the central area has a diameter of 15 millimeters. The silicon part is fixed to a support (5) comprising a series of electromagnets (6) disposed opposite each of the permanent magnets (4). An electronic circuit controls each of the electromagnets (6).

The method of manufacturing the magnetic deformable mirror is as follows:

1/Preparing the Magnet:
- a sheet of non-adhesive material, for example Kapton (trade name), with a thickness of 100 micrometers is disposed on a steel support;
- the magnets are disposed on this sheet and then aligned with the help of a template.

2/Preparing the Membrane:
- selective etching of an SOI-type silicon wafer (total thickness: 500 micrometers);
- a 20-micrometer silicon membrane is obtained, framed on a 500-micrometer silicon support;
- this frame is fixed by adhesion to a metallic plate which acts as a mechanical interface;
- a uniform layer (100 micrometers thick) of liquid silicon adhesive is deposited by centrifugation (spin coater);
- the adhesive is allowed to dry partially for a few minutes.

3/Assembly:
- the adhesive membrane is placed over the magnets by a translation device;
- after contact, translation continues for 50 micrometers, to partially sink the magnets into the adhesive, which is still very soft;
- once completely dry (10 hours), the membrane covered in magnets is removed.

The structure described above is a strictly non-limiting example.

The invention claimed is:

1. An optoelectric device comprising:
a deformable membrane with an outer reflecting surface and an inner surface whereon a plurality of permanent magnets are fixed, and having a bottom surface entirely coated with a continuous layer of a flexible material; and
a support including a plurality of electromagnets placed opposite the permanent magnets to exert an electromagnetic force thereon, locally displacing a zone corresponding to the deformable membrane.

2. The device according to claim 1, wherein the flexible material is an adhesive layer.

3. The device according to claim 1, wherein the membrane includes a relatively thin portion providing a mechanical bond with the electromagnet support.

4. The device according to claim 1, wherein the membrane is made of silicon.

5. The device according to claim 1, wherein the membrane has a thickness comprising between 5 and 50 micrometers.

6. The device according to claim 1, wherein the electromagnets include a core with a cylindrical area whereon a spool is placed, at least one part of the core being housed in a plate with housings organized in a configuration identical to that of the magnets fixed to the membrane.

7. The device according to claim 1, wherein the magnets and the electromagnets form an N×N array with unoccupied corners.

8. The device according to claim 1, wherein the membrane has an active central disc-shaped area equipped with magnets and a peripheral annular area free of magnets.

9. The device according to claim 8, wherein the diameter of the active area is between 0.3 and 0.7 times the outer diameter of the membrane.

10. A method of manufacturing an optoelectric device comprising a deformable membrane with an outer reflecting surface and an inner surface whereon a plurality of permanent magnets are fixed, comprising:
depositing an adhesive film over the entire bottom surface of the membrane; and
depositing the permanent magnets on a part of the adhesive surface.

11. The method according to clam 10, wherein depositing the adhesive is carried out by centrifugation of the adhesive deposited locally on a surface of the membrane.

12. The method according to claim 10, wherein the permanent magnets are disposed on a temporary support, the adhesive surface being then moved over the surface of the magnets thus predisposed.

13. The method according to claim 10, wherein the membrane is formed by reducing thickness of a disc-shaped area of a homogenous block.

14. The device according to claim 13, wherein the membrane formation step is carried out by plasma etching.

15. The device according to claim 13, wherein membrane formation is carried out by photolithography.

16. The device according to claim 13, wherein membrane formation is carried out by chemical etching.

* * * * *